(12) United States Patent
Inai et al.

(10) Patent No.: US 9,902,248 B2
(45) Date of Patent: Feb. 27, 2018

(54) VEHICLE-USE SEAL STRUCTURE

(71) Applicant: HONDA MOTOR CO., LTD., Tokyo (JP)

(72) Inventors: Yohei Inai, Wako (JP); Hiroshi Tokuyama, Wako (JP); Jun Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/902,064

(22) PCT Filed: Jul. 2, 2014

(86) PCT No.: PCT/JP2014/067662
§ 371 (c)(1),
(2) Date: Dec. 30, 2015

(87) PCT Pub. No.: WO2015/002236
PCT Pub. Date: Jan. 8, 2015

(65) Prior Publication Data
US 2016/0144698 A1   May 26, 2016

(30) Foreign Application Priority Data
Jul. 3, 2013   (JP) ................. 2013-140061

(51) Int. Cl.
*B60J 10/27* (2016.01)
*B60J 10/84* (2016.01)
*B60J 10/36* (2016.01)

(52) U.S. Cl.
CPC ............... *B60J 10/27* (2016.02); *B60J 10/36* (2016.02); *B60J 10/84* (2016.02)

(58) Field of Classification Search
CPC ............ B60J 10/27; B60J 10/36; B60J 10/84
(Continued)

(56) References Cited

U.S. PATENT DOCUMENTS 5,806,914 A * 9/1998 Okada ............... B60J 10/248
296/146.9
6,601,346 B2 * 8/2003 Nozaki ............... B60J 10/16
49/480.1

(Continued)

FOREIGN PATENT DOCUMENTS

JP        05038946 A  *  2/1993
JP      2001-105994 A      4/2001
(Continued)

OTHER PUBLICATIONS

Machine translation of JP 2001246990 A.*
(Continued)

*Primary Examiner* — Katherine W Mitchell
*Assistant Examiner* — Marcus Menezes
(74) *Attorney, Agent, or Firm* — Westerman, Hattori, Daniels & Adrian, LLP (57) ABSTRACT

A vehicle-use seal structure is provided with a seal member which is attached to a door opening part. The seal member has the following: a seal base part which is attached to a seal attachment wall by a plurality of clips; a first seal lip provided to a connection part of the seal base part; and a second lip seal provided to the connection part. The first lip seal abuts a flange part of a front side door. The second lip seal abuts an orthogonal part that is substantially orthogonal to the flange part and extends in the vehicle interior direction.

7 Claims, 8 Drawing Sheets

(58) Field of Classification Search
USPC .............................................. 49/484.1, 492.1
See application file for complete search history.

(56) References Cited

U.S. PATENT DOCUMENTS

| | | | | |
|---|---|---|---|---|
| 7,380,862 | B2* | 6/2008 | Olney ...................... | B60J 10/90 296/107.04 |
| 8,353,130 | B2* | 1/2013 | Fukuta ..................... | B60J 10/24 49/493.1 |
| 2005/0279027 | A1* | 12/2005 | Tsuchida ................. | B60J 10/24 49/495.1 |
| 2006/0162258 | A1* | 7/2006 | Yamashita ............... | B60J 10/24 49/495.1 |

FOREIGN PATENT DOCUMENTS

| | | | | | |
|---|---|---|---|---|---|
| JP | 2001-246990 | A | | 9/2001 | |
| JP | 2001246990 | A | * | 9/2001 | ............ B60R 13/06 |
| JP | 2003-25931 | A | | 1/2003 | |
| JP | 5055017 | B2 | | 10/2012 | |

OTHER PUBLICATIONS

International Search Report dated Aug. 12, 2014, issued in counterpart International Application No. PCT/JP2014/067662 (1 page).
Notification of Transmittal of the Translation of the International Preliminary Report on Patentability (Form PCT/IB/338) dated Jan. 7, 2016, with Form PCT/IPEA/409, issued in counterpart International Patent Application No. PCT/JP2014/067662. (4 pages).

* cited by examiner

VEHICLE-USE SEAL STRUCTURE

TECHNICAL FIELD

The present invention relates to a vehicular seal structure including a sealing member for sealing up a gap between a door and a door opening part when the door opening part has been closed by the door.

BACKGROUND ART

A vehicle has a door opening part in a vehicle body and a vehicular seal structure in the peripheral edge of the door opening part, and the vehicle is configured so that when the door opening part has been closed by a door, a gap between the door opening part and the door is closed off by the vehicular seal structure. A known example of this vehicular seal structure is one in which a hollow sealing member is attached by a plurality of clips along the peripheral edge of the door opening part (for example, see Patent Literature 1).

Due to the hollow sealing member being attached to the door opening part, when the door opening part has been closed by the door, the sealing member is pressed into the door opening part by the door, and the gap between the door opening part and the door can be closed off by the sealing member.

In the seal structure of Patent Document 1, the sealing member is attached to the door opening part by a plurality of clips. Consequently, it is preferable that the pressing force of the door be transmitted so that the sealing member stabilizes when the sealing member has been pressed in by the door.

The sealing member in this example is formed in a hollow configuration. Therefore, it is believed that with the sealing member pressed in by the door, the pressing force of the door is transmitted to a curved part of the sealing member and dispersed by the sealing member.

Therefore, it is difficult to transmit the pressing force of the door so that the sealing member stabilizes, which leaves room for improvement.

PRIOR ART LITERATURE

Patent Literature

[Patent Literature 1] Japanese Patent No. 5055017

SUMMARY OF INVENTION

Technical Problem

The present invention addresses the problem of providing a vehicular seal structure in which a sealing member can be held in a stable state by the pressing force of a door when a door opening part has been closed by the door.

Solution to Problem

According to an aspect of the present invention, there is provided a vehicular seal structure in which a sealing member is attached to a door opening part formed in a vehicle body, and a gap between a door and the door opening part is closed off by the sealing member when the door opening part has been closed by the door, wherein the vehicular seal structure is characterized in that the sealing member is secured solely by clips to a seal attachment wall that is a flat surface of the door opening part to which the sealing member is attached, and the sealing member has: a seal base part abutting the seal attachment wall due to being attached to the seal attachment wall by the clips; a first lip seal provided to a connecting part of the seal base part and abutting a flange part to which an inner panel and outer panel of the door are joined; and a second lip seal provided to the connecting part and abutting an orthogonal part which is a part of the inner panel that is substantially orthogonal to the flange part and that extends inward with respect to the vehicle.

Preferably, the sealing member is provided to the seal attachment wall on the upper side of the door opening part; the seal base part of the sealing member extends vertically along the seal attachment wall, the lower end of the seal base part being formed at the connecting part and the second lip seal extending downward from the connecting part; and the orthogonal part, on which the second lip seal abuts, being formed substantially orthogonal to the seal attachment wall.

Preferably, a hollow part is formed in the seal base part.

Preferably, an upper wall extends laterally outward from the upper end of the seal attachment wall so as to be substantially orthogonal to the seal attachment wall, a concave corner part being formed at the intersecting part of the upper wall and the seal attachment wall; the sealing member has a third lip seal extending from the seal base part toward the upper wall; and the third lip seal abuts the corner part.

Preferably, a first base part of the first lip seal is connected to the connecting part, and the first base part is formed into a thin part that is thinner than other sections.

Preferably, a second base part of the second lip seal is connected to the connecting part, and the second base part is formed into a thin part having a smaller thickness dimension than other sections.

Preferably, the second lip seal has a laterally outer distal end arranged on the laterally outer side of the first lip seal, and the distal end has a protruding part that protrudes upward.

Advantageous Effects of Invention

In the present invention, the seal base part is made to abut the seal attachment wall, and the first lip seal and the second lip seal are provided to the connecting part of the seal base part. Furthermore, the first lip seal is made to abut the flange part of the door, and the second lip seal is made to abut the orthogonal part of the door.

Consequently, when the door has been closed, a first pressing force acts on the first lip seal from the flange part, and a second pressing force acts on the second lip seal from the orthogonal part. The first pressing force and the second pressing force act in substantially orthogonal directions.

In the invention, the first lip seal and the second lip seal can cause the pressing forces transmitted to the lip seals to be transmitted more effectively than with hollow seals, without dispersing the pressing forces. Consequently, the first pressing force acting on the first lip seal and the second pressing force acting on the second lip seal can be directed in substantially orthogonal directions and concentrated in the connecting part.

Due to the first pressing force and the second pressing force being thus concentrated in the connecting part, the pressing forces can be satisfactorily borne by the connecting part. Deformation of the seal base part caused by the first pressing force and the second pressing force can be suppressed and the seal base part can be positioned in a predetermined position.

The sealing member can thereby be held stable by the pressing force of the door when the door opening part has been closed by the door.

In the invention, the seal base part is provided along the seal attachment wall of the door opening part (the upper side). Furthermore, the lower end of the seal base part is formed at the connecting part, and the second lip seal is extended downward from the connecting part. Additionally, the orthogonal part on which the second lip seal abuts is substantially orthogonal to the seal attachment wall.

The orthogonal part in this aspect is formed so as to be substantially orthogonal to the flange part. Consequently, the flange part is formed along the seal attachment wall. The first pressing force acting on the first lip seal from the flange part thereby acts in a direction of pushing the seal base part against the seal attachment wall. Furthermore, the second pressing force acting on the second lip seal from the orthogonal part acts in a direction of pushing the seal base part upward.

Thus, due to the action of the first pressing force and the second pressing force, the sealing member can be kept from hanging down due to its own weight by the first pressing force and the second pressing force, and the sealing member can be held stable on the seal attachment wall.

In the invention, a hollow part is formed in the seal base part. The clips can thereby be accommodated in the hollow part. Furthermore, the seal base part can be formed into an annular shape in cross section and the seal base part can be made reliably rigid by forming the hollow part in the seal base part.

In the invention, the third lip seal of the sealing member is made to abut the corner part. Consequently, the seal base part is pushed upward by the second pressing force, and the third lip seal is thereby pushed against the corner part. The sealing member can thereby be held even more stable on the seal attachment wall.

In the invention, the first base part of the first lip seal is connected to the connecting part, and the first base part is made into a thin part having a smaller thickness dimension than the other sections. Consequently, the thin part can be flexibly deformed by the first pressing force acting on the first lip seal.

The thin part is thereby flexibly deformed by the first pressing force when the door is closed, and the door can be smoothly closed by preventing the first lip seal from bending in the opposite direction.

In the invention, the second base part of the second lip seal is connected to the connecting part, and the second base part is made into a thin part having a smaller thickness dimension than the other sections. Consequently, the thin part can be flexibly deformed by the second pressing force acting on the second lip seal.

The thin part is thereby flexibly deformed by the second pressing force when the door is closed, and the door can be smoothly closed by preventing the second lip seal from bending in the opposite direction.

In the invention, the distal end of the second lip seal is arranged farther laterally outward than the first lip seal, and the protruding part is made to protrude upward from the distal end. Consequently, the groove part can be formed by the protruding part and the distal end.

This groove part fulfills the role of a drainage groove for guiding water droplets dripping from the first lip seal onto the second lip seal to a drainage location.

DESCRIPTION OF EMBODIMENTS

An embodiment of the present invention is described below with reference to the accompanying drawings. The terms "front (Fr)," "rear (Rr)," "left (L)," and "right (R)" conform with the directions from the perspective of the driver.

Embodiments

A vehicular seal structure 25 according to the embodiment shall be described. The vehicular seal structure 25 is described as "the seal structure 25" in the embodiment.

Figure 1:
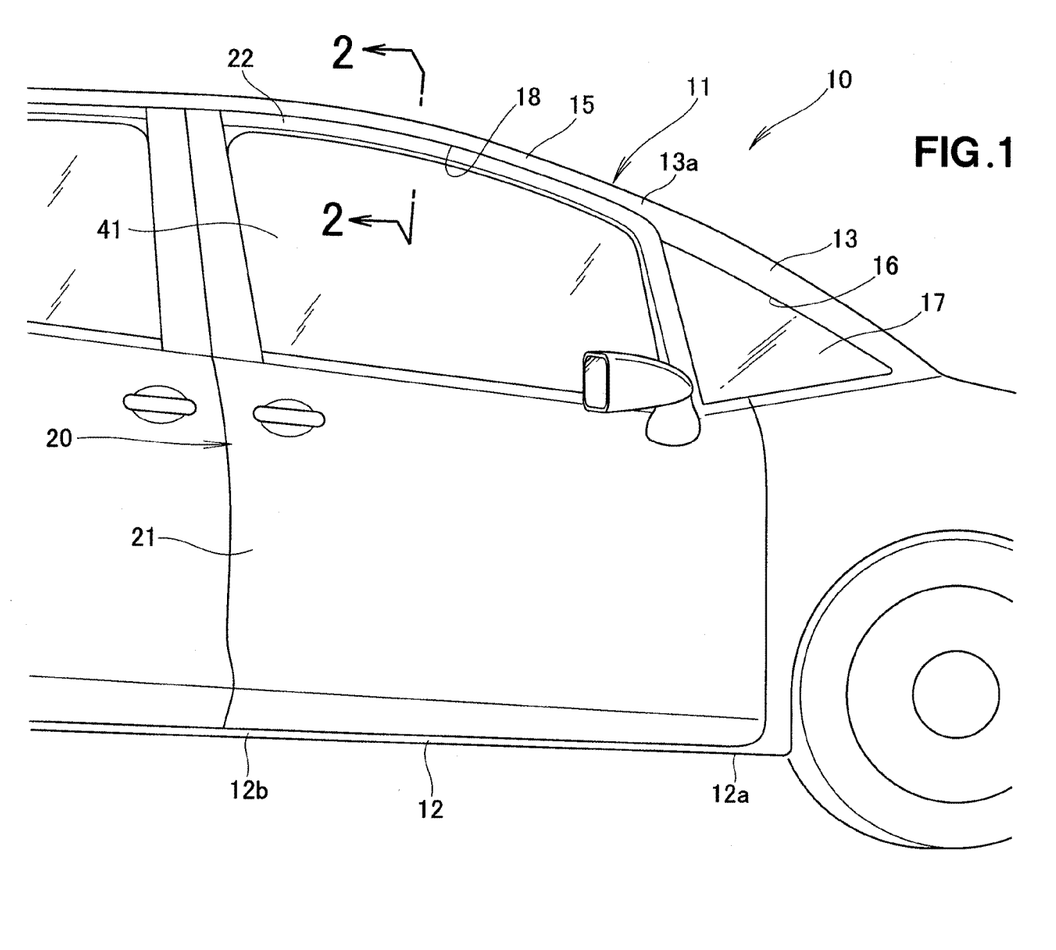
FIG. 1 is a perspective view showing a vehicle including the vehicular seal structure according to the present invention.

As shown in FIG. 1, a vehicle includes a side sill 12 provided to the lower part of a vehicle body 11, a front pillar 13 rising upward from the front end part 12a of the side sill 12, a center pillar (not shown) rising upward from the middle 12b of the side sill 12, and a roof rail 15 spanning between the upper ends 13a of the center pillar and the front pillar 13.

Furthermore, the vehicle 10 includes: a front corner glass (triangular window glass) 17 provided to an opening 16 in the front pillar 13; a door opening part 18 formed in the vehicle body 11 by the side sill 12, the front pillar 13, the center pillar, and the roof rail 15; a front side door 20 provided in an openable and closeable manner to the door opening part 18; and a seal structure 25 (see FIG. 2) interposed between the front side door 20 and the door opening part 18.

The upper side of the door opening part 18 is formed by the roof rail 15.

Figure 2:
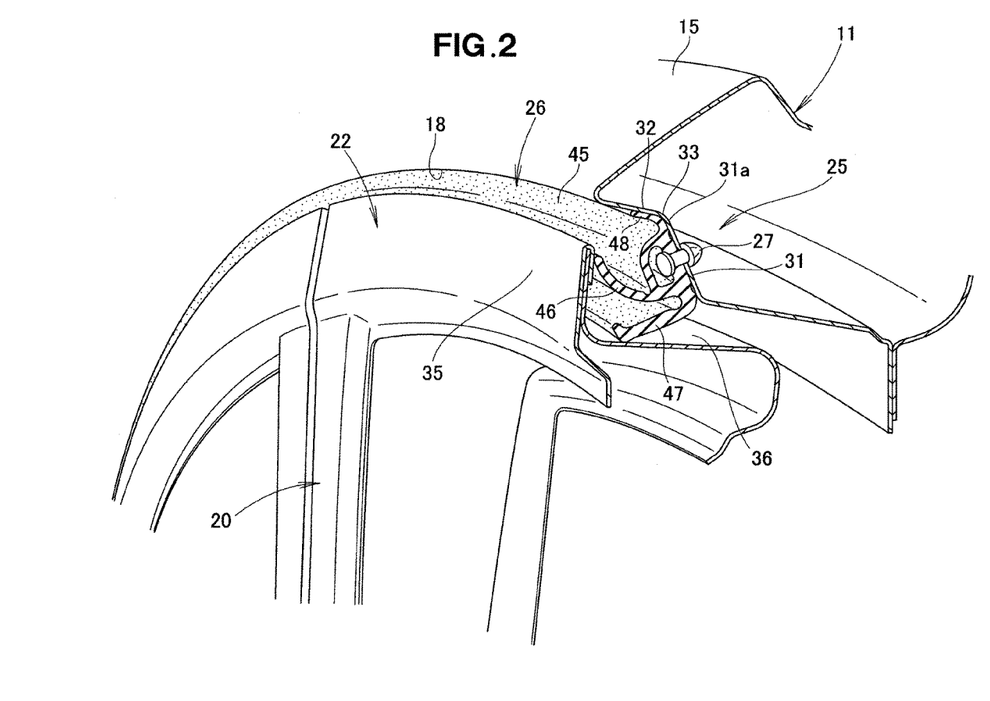
FIG. 2 is a perspective view showing the state of the vehicle in FIG. 1 as having been sectioned by line 2-2, with the side window glass removed.

As shown in FIG. 2, the door opening part 18 has a seal attachment wall (also referred to as the seal attachment surface) 31 provided to the roof rail 15, an upper wall 32 extending laterally outward from the upper end 31a of the seal attachment wall 31, and a corner part 33 formed in the intersecting part of the seal attachment wall 31 and the upper wall 32.

The seal attachment wall 31, the upper wall 32, and the corner part 33 are provided to the roof rail 15 (i.e., to the upper side of the door opening part 18).

Figure 3:
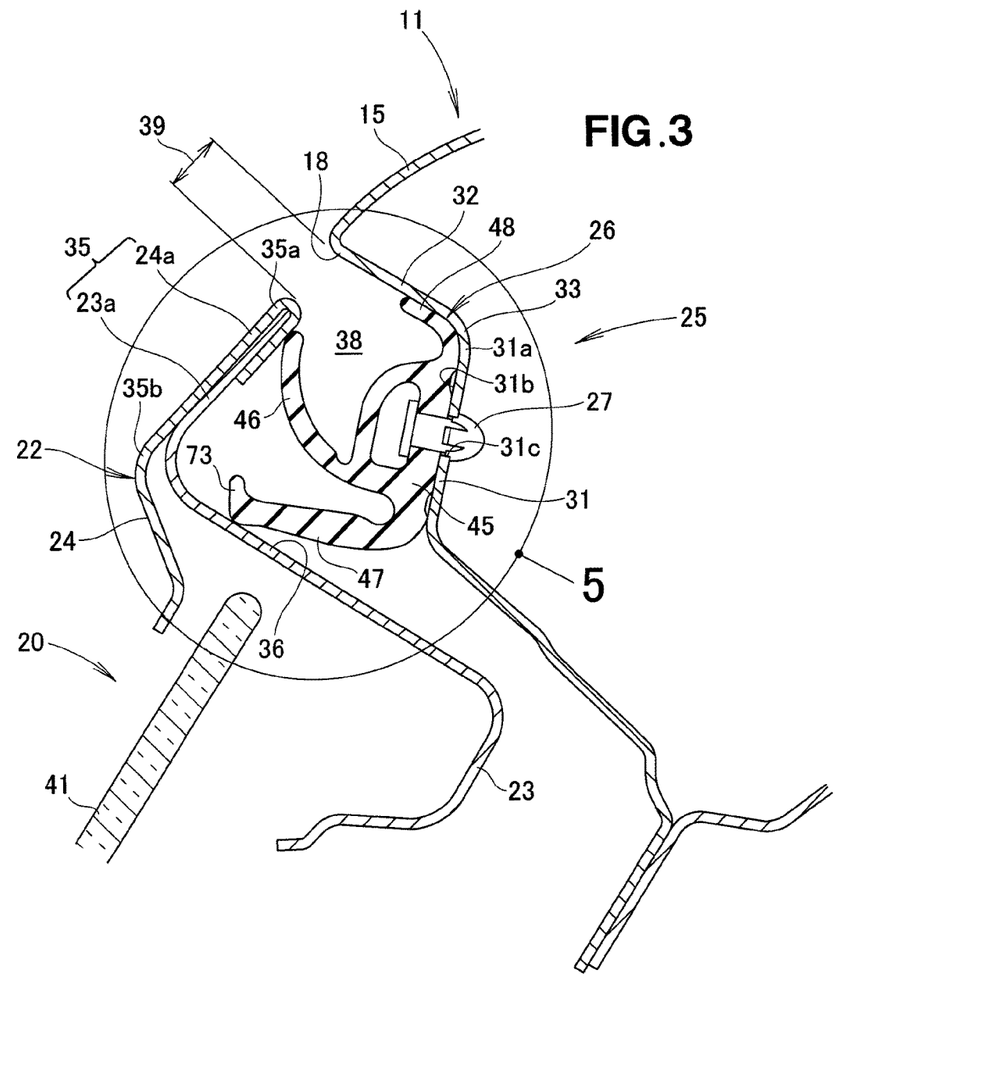
FIG. 3 is a cross-sectional view taken along line 2-2 of FIG. 1.
Figure 4:
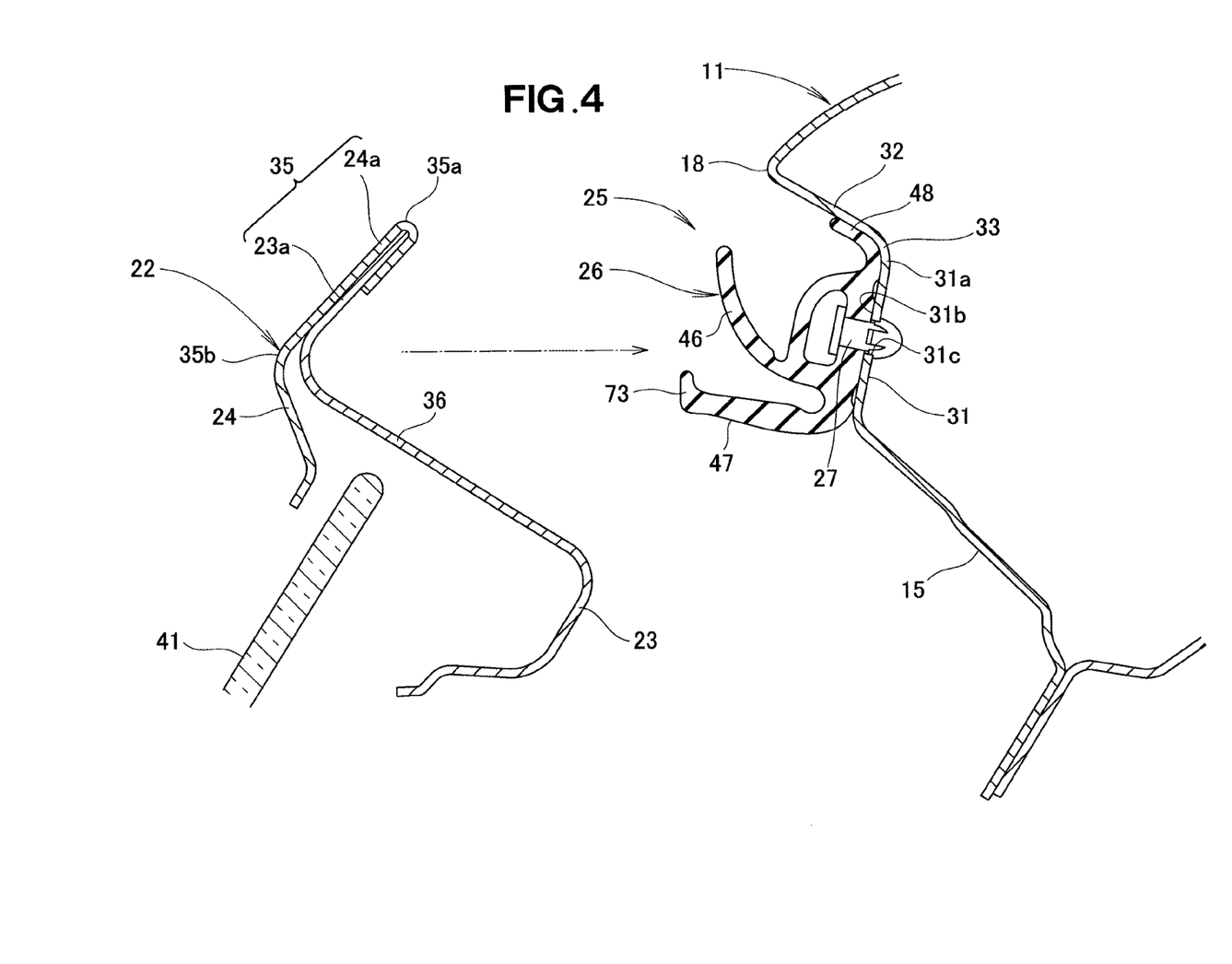
FIG. 4 is a cross-sectional view showing the front side door of FIG. 3 as having been opened from the door opening part.

As shown in FIGS. 3 and 4, the seal attachment wall 31 is a flat surface formed to be substantially vertical, the outer surface 31b of which faces outward with respect to the vehicle. A plurality of interlocking holes 31c are formed in the seal attachment wall 31, at predetermined intervals in the vehicle-longitudinal direction.

The upper wall 32 extends laterally outward from the upper end 31a of the seal attachment wall 31 so as to be substantially orthogonal to the seal attachment wall 31. The corner part 33 is formed in a concave shape at the intersecting part where the seal attachment wall 31 and the upper wall 32 intersect.

In the front side door 20, a door panel 21 (see FIG. 1) and a door sash 22 are formed by an inner panel 23 and an outer panel 24. A side window glass 41 is supported in the door sash 22 so as to be capable of being raised or lowered.

The door sash 22 has a flange part 35 to which the upper end 23a of the inner panel 23 and the upper end 24a of the outer panel 24 are joined, and an orthogonal part 36 extending inward with respect to the vehicle so as to be substantially orthogonal to the flange part 35.

The flange part 35 is formed by hemming with the upper end 23a of the inner panel 23 and the upper end 24a of the outer panel 24 being superposed. The flange part 35 is arranged on the laterally outer side of the seal attachment wall 31 when the door opening part 18 has been closed by the front side door 20.

Specifically, the flange part 35 is arranged at a predetermined gap from the seal attachment wall 31, and from the upper end 35a to the lower end 35b, the flange part 35 is inclined laterally outward so as to gradually move away from the seal attachment wall 31.

The orthogonal part 36, formed by the inner panel 23, is extended inward with respect to the vehicle in a decline from the lower end 35b of the flange part 35, so as to be substantially orthogonal to the flange part 35. This orthogonal part 36 is formed so as to be substantially orthogonal to the flange part 35, and also substantially orthogonal to the seal attachment wall 31.

When the door opening part 18 has been closed by the front side door 20, an inner gap 38 is formed between the front side door 20 (the flange part 35, the orthogonal part 36) and the door opening part 18 (the seal attachment wall 31, the upper wall 32, the corner part 33).

Furthermore, an outer gap 39 is formed between the flange part 35 and the upper wall 32.

Figure 5:
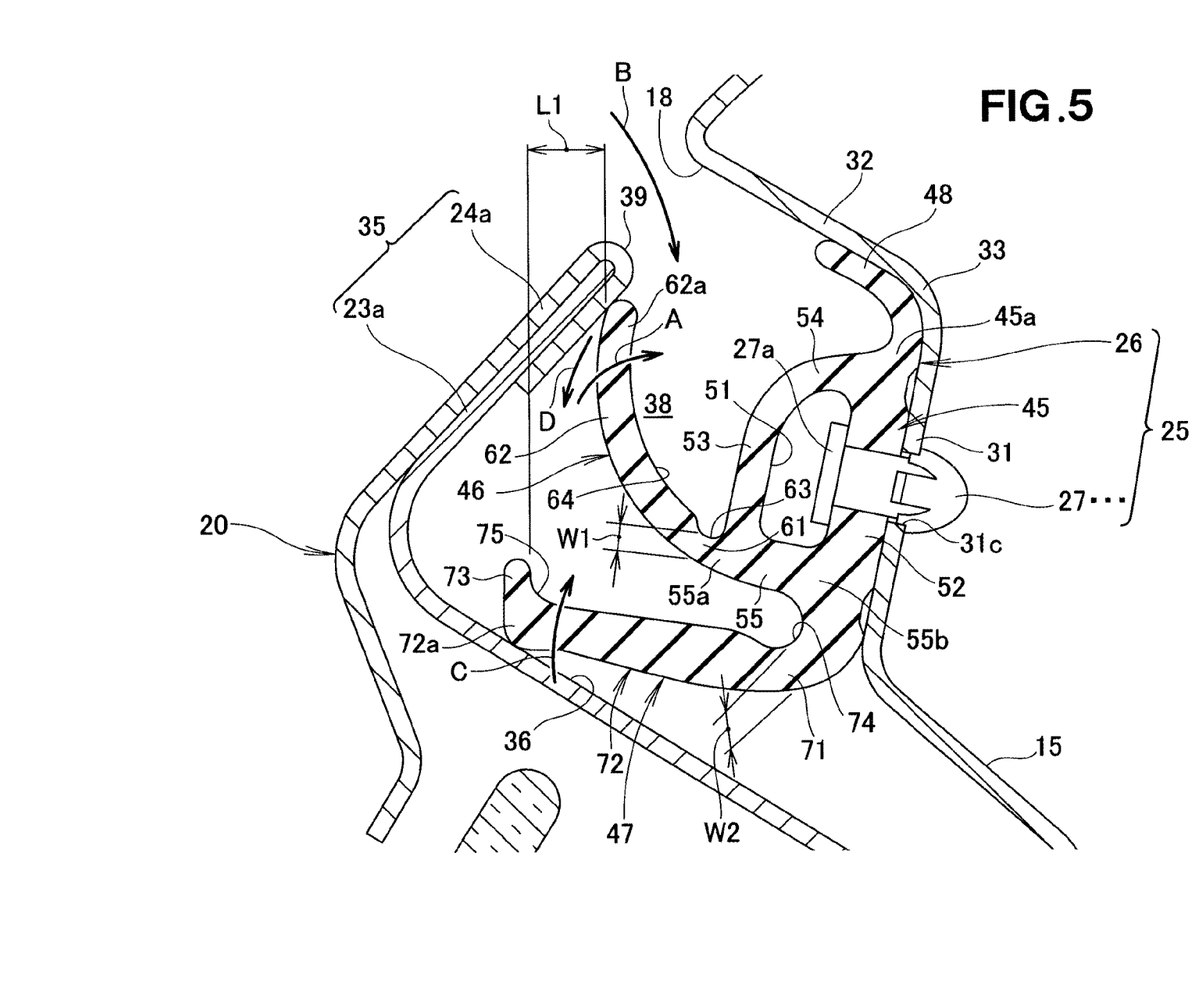
FIG. 5 is an enlarged view of section 5 of FIG. 3.

As shown in FIG. 5, the seal structure 25 includes a sealing member 26 for sealing up the inner gap 38 between the front side door 20 and the door opening part 18, and a plurality of clips 27 for attaching the sealing member 26 to the door opening part 18.

The sealing member 26 extends in the vehicular longitudinal direction along the upper part of the door opening part 18 (specifically, the seal attachment wall 31).

This sealing member 26 has a seal base part 45 attached to the seal attachment wall 31 by the plurality of clips 27, a first lip seal 46 provided directly to a connecting part 55 of the seal base part 45, a second lip seal 47 provided to the connecting part 55, and a third lip seal 48 extending from the seal base part 45 toward the upper wall 32.

The seal base part 45, which has a substantially rectangular outer shape in cross section, is formed in a hollow configuration so as to have a hollow part 51 in the interior.

Due to the hollow part 51 being formed in the seal base part 45, head parts 27a of the plurality of clips 27 can be accommodated in the hollow part 51. Furthermore, due to the hollow part 51 being formed in the seal base part 45, the seal base part 45 can be formed into an annular shape in cross section and the seal base part 45 can be kept reliably rigid.

The seal base part 45 has an inner base part 52 facing the seal attachment wall 31, an outer base part 53 provided farther laterally outward than the inner base part 52, an upper base part 54 linking the upper end of the inner base part 52 and the upper end of the outer base part 53, and a lower base part 55 (referred to below as "the connecting part 55") linking the lower end of the inner base part 52 and the lower end of the outer base part 53.

The plurality of clips 27 are attached to the inner base part 52 at predetermined intervals in the vehicular longitudinal direction. The inner base part 52 is attached to the seal attachment wall 31 by interlocking the plurality of clips 27 in the plurality of interlocking holes 31c.

Due to the inner base part 52 being attached to the seal attachment wall 31 by the plurality of clips 27, the inner base part 52 abuts along the seal attachment wall 31 while extending vertically.

In other words, the sealing member 26 is secured to the seal attachment wall 31 solely by the plurality of clips 27.

The lower base part 55 is the section where the lower end of the seal base part 45 is formed by linking the lower end of the inner base part 52 and the lower end of the outer base part 53. In other words, the connecting part 55 projects laterally outward from the lower end of the inner base part 52 toward the lower end of the outer base part 53.

The first lip seal 46 has a first base part 61 connected to an outer end 55a of the connecting part 55, and a first lip 62 extending in an upward-curving shape from the first base part 61 toward the flange part 35.

Specifically, the first lip seal 46 extends in an upward-curving shape, upward from the outer end 55a of the connecting part 55.

The first base part 61 is formed as a thin part having a smaller thickness dimension W1 than the first lip 62, due to having a concave part 63 formed in the upper surface. Consequently, the first lip seal 46 can be flexibly (smoothly) deformed upward (in the direction of arrow A) with the first base part 61 as a fulcrum.

Due to the door opening part 18 being closed by the front side door 20, the distal end 62a of the first lip 62 is pressed laterally inward (toward the seal base part 45) by the flange part 35. In this state, the first lip seal 46 flexibly deforms with the first base part 61 as a fulcrum, and the distal end 62a of the first lip 62 remains abutting the flange part 35.

Due to the distal end 62a of the first lip 62 abutting the flange part 35, the space between the distal end 62a of the first lip 62 and the flange part 35 is closed off. In this state, a first groove part 64 is formed by the first lip seal 46 and the outer base part 53 of the seal base part 45.

Droplets of rainwater or the like dripping down as shown by arrow B from the outer gap 39 between the flange part 35 and the upper wall 32 can thereby be caught in the first groove part 64 and drained in the vehicular longitudinal direction along the first groove part 64.

The second lip seal 47 has a second base part 71 connected to the inner end 55b of the connecting part 55, a second lip 72 extending in a decline from the second base part 71 toward the orthogonal part 36, and a protruding part 73 protruding upward from the distal end 72a of the second lip 72.

Specifically, the second lip seal 47 extends in a decline, downward from the inner end 55b of the connecting part 55.

The second base part 71 is formed as a thin part having a smaller thickness dimension W2 than the second lip 72, due to having a concave part 74 formed in the upper surface. Consequently, the second lip seal 47 can be flexibly (smoothly) deformed upward (in the direction of arrow C) with the second base part 71 as a fulcrum.

When the door opening part 18 has been closed by the front side door 20, the distal end 72a of the second lip 72 is pressed toward the upper wall 32 by the orthogonal part 36. In this state, the second lip seal 47 flexibly deforms with the second base part 71 as a fulcrum, and the distal end 72a of the second lip 72 is kept in a state of abutting the orthogonal part 36.

With the distal end 72a of the second lip 72 abutting the orthogonal part 36, the distal end 72a is arranged farther laterally outward than the distal end 62a of the first lip 62. The protruding part 73 protrudes upward from the distal end 72a of the second lip 72 so as to be orthogonal to the second lip 72.

Consequently, the protruding part 73 is arranged laterally outward away from the distal end 62a of the first lip 62 by a distance L1.

Due to the distal end 72a of the second lip 72 abutting the orthogonal part 36, the space between the distal end 72a of the second lip 72 and the orthogonal part 36 is closed off. In this state, a second groove part 75 is formed by the second lip 72 and the protruding part 73.

Droplets of rainwater or the like dripping down as shown by arrow D into the inner gap 38 between the flange part 35 and the distal end 62a of the first lip 62 can thereby be caught in the second groove part 75. The second groove part 75 fulfills the role of a drainage groove for guiding water droplets dripping onto the second lip seal 47 to a drainage location.

The third lip seal 48 abuts the corner part 33 and the upper wall 32 due to extending from the seal base part 45 (specifically, the intersecting part 45a between the inner base part 52 and the upper base part 54) toward the upper wall 32.

The space between the third lip seal 48 and the upper wall 32 is thereby closed off.

Thus, when the door opening part 18 has been closed by the front side door 20, the space between the flange part 35 and the distal end 62a of the first lip 62 is closed off, the space between the orthogonal part 36 and the distal end 72a of the second lip 72 is closed off as well, and additionally, the space between the third lip seal 48 and the upper wall 32 is closed off.

The inner gap 38 between the door opening part 18 and the front side door 20 is thereby closed off by the sealing member 26.

Figure 6:
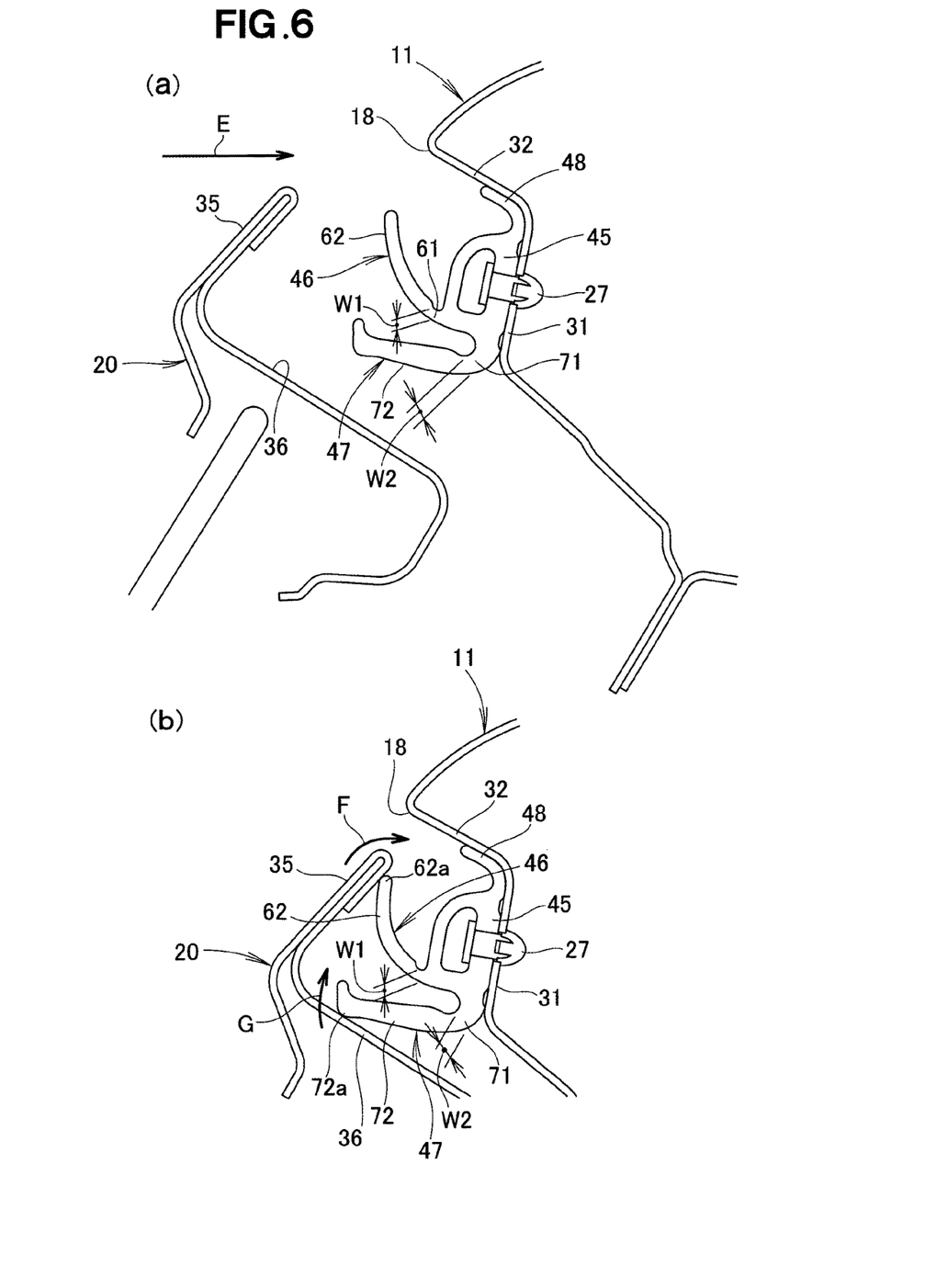
FIG. 6 is a drawing illustrating an example in which the door opening part is closed by the front side door according to the present invention.

Next, an example of the door opening part 18 being closed by the front side door 20 is described with reference to FIG. 6.

As shown in FIG. 6(a), the front side door 20 moves as indicated by arrow E so that the door opening part 18 is closed by the front side door 20.

The first base part 61 of the first lip seal 46 is formed with a thickness dimension W1 smaller than that of the first lip 62. Furthermore, the second base part 71 of the second lip seal 47 is formed with a thickness dimension W2 smaller than that of the second lip 72.

As shown in FIG. 6(b), the flange part 35 of the front side door 20 abuts the distal end 62a of the first lip seal 46 (the first lip 62), whereby laterally inward first pressing force acts on the distal end 62a.

Because the first base part 61 is formed with a small thickness dimension W1, the first lip seal 46 can be flexibly (smoothly) deformed upward (in the direction of arrow F) with the first base part 61 as a fulcrum. Bending of the first lip seal 46 in the opposite direction can thereby be prevented.

Similarly, the orthogonal part 36 abuts the distal end 72a of the second lip seal 47 (the second lip 72), whereby upward second pressing force acts on the distal end 72a.

Because the second base part 71 is formed with a small thickness dimension W2, the second lip seal 47 can be flexibly (smoothly) deformed upward (in the direction of arrow G) with the second base part 71 as a fulcrum. Bending of the second lip seal 47 in the opposite direction can thereby be prevented.

Thus, the front side door 20 can be smoothly closed into the door opening part 18 by flexibly deforming the first lip seal 46 upward (in the direction of arrow F) and also flexibly deforming the second lip seal 47 upward (in the direction of arrow G).

Figure 7:
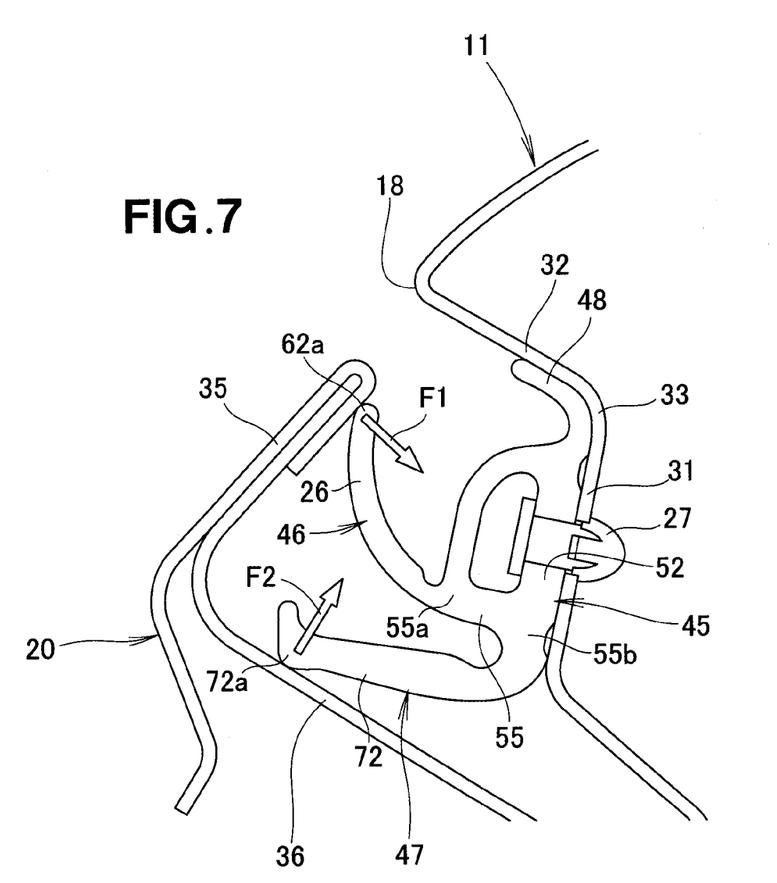
FIG. 7 is a drawing illustrating an example in which the sealing member is held by a pressing force acting on the sealing member from the front side door according to the present invention.

Next, FIG. 7 is referenced to describe an example in which the sealing member 26 is held stable by the first pressing force F1 and second pressing force F2 acting on the sealing member 26, when the door opening part 18 has been closed by the front side door 20.

As shown in FIG. 7, when the door opening part 18 has been closed by the front side door 20, the distal end 62a of the first lip seal 46 (the first lip 62) abuts the flange part 35, and the distal end 72a of the second lip seal (the second lip 72) abuts the orthogonal part 36.

Consequently, the first pressing force F1 acts on the distal end 62a of the first lip 62 from the flange part 35, and the second pressing force F2 acts on the distal end 72a of the second lip 72 from the orthogonal part 36. The first pressing force F1 and the second pressing force F2 act in substantially orthogonal directions. The pressing forces F1, F2 having been transmitted to the first lip seal 46 and the second lip seal 47, the lip seals 46, 47 can cause the pressing forces to be transmitted more effectively than hollow seals without dispersing them. Consequently, the first pressing force F1 acting on the first lip seal 46 and the second pressing force F2 acting on the second lip seal 47 can be directed in substantially orthogonal directions and concentrated in the connecting part 55.

Thus, due to the first pressing force F1 and the second pressing force F2 being concentrated in the connecting part 55, the pressing forces F1, F2 can be satisfactorily borne by the connecting part 55. Deformation of the seal base part 45 caused by the first pressing force F1 and the second pressing force F2 can be suppressed and the seal base part 45 can be positioned in a predetermined position.

The sealing member 26 can thereby be held stable by the pressing forces F1, F2 of the front side door 20 when the door opening part 18 has been closed by the front side door 20.

The seal base part 45 (specifically, the inner base part 52) is provided along the seal attachment wall 31 of the door opening part 18. Furthermore, the lower end of the seal base part 45 is formed by the connecting part 55, and the second lip seal 47 extends downward from the inner end 55b of the connecting part 55. Additionally, the orthogonal part 36 on which the second lip seal 47 abuts is substantially orthogonal to the seal attachment wall 31.

The orthogonal part 36 is formed so as to be substantially orthogonal to the flange part 35. Consequently, the flange part 35 is formed along the seal attachment wall 31.

The first pressing force F1 acting on the first lip seal 46 from the flange part 35 thereby acts in a direction of pushing the seal base part 45 against the seal attachment wall 31.

Furthermore, the second pressing force F2 acting on the second lip seal 47 from the orthogonal part 36 acts in a direction of pushing the seal base part 45 upward.

Thus, due to the seal base part 45 being pushed against the seal attachment wall 31 by the first pressing force F1 and the seal base part 45 being pushed upward by the second pressing force F2, the sealing member 26 can be kept from hanging down due to its own weight. The sealing member 26 can thereby be held stable on the seal attachment wall 31.

Furthermore, the third lip seal 48 of the sealing member 26 is extended so as to abut the corner part 33. Consequently, the seal base part 45 is pushed upward by the second pressing force F2, whereby the third lip seal 48 can be pushed against the corner part 33.

The sealing member 26 can thereby be held even more stable on the seal attachment wall 31.

Figure 8:
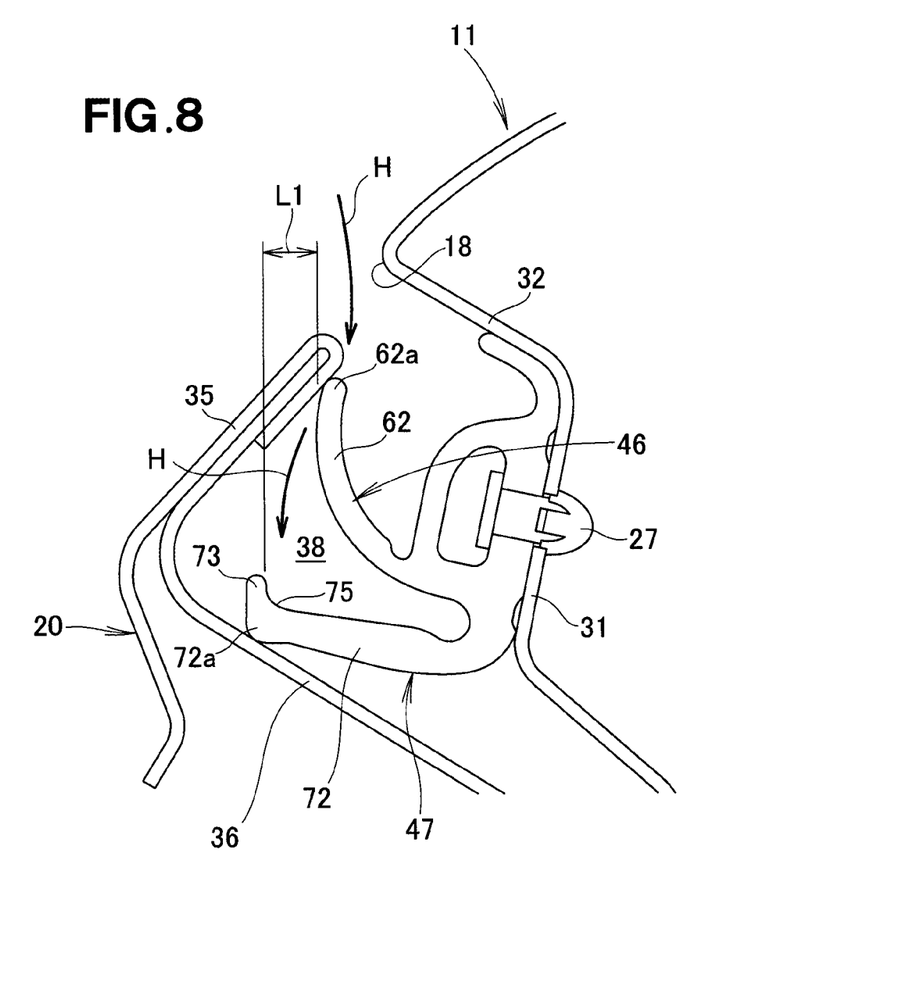
FIG. 8 is a drawing illustrating an example in which water droplets dripping onto the second lip seal according to the present invention are drained by the second groove part.

Next, FIG. 8 is referenced to describe an example of water droplets dripping onto the second lip seal 47 being drained by the second groove part 75.

As shown in FIG. 8, the protruding part 73 is disposed laterally outward away from the distal end 62a of the first lip seal 46 (the first lip 62) by a distance L1. The second groove part 75 is formed by the protruding part 73 and the distal end 72a of the second lip 72.

Consequently, the second groove part 75 can catch droplets of rainwater or the like that have seeped in as indicated by arrow H into the inner gap 38 from between the flange part 35 and the distal end 62a of the first lip 62, and dripped onto the second lip seal 47.

Droplets that have dripped onto the second lip seal 47 can thereby be guided to a drainage location by the second groove part 75.

The embodiment previously described is not provided by way of limitation to the vehicular seal structure according to the present invention, and may be modifies, improved, or otherwise altered as appropriate.

For example, the shapes and configurations of the vehicle, the vehicle body, the door opening part, the front side door, the inner panel, the outer panel, the seal structure, the sealing member, the clips, the seal attachment wall, the upper wall, the corner part, the flange part, the seal base part, the first lip seal, the second lip seal, the third lip seal, the connecting part, the first base part, the first lip, the second base part, the second lip, the protruding part, and other components presented in the previous embodiment are not limited to those exemplified and can be altered as appropriate.

INDUSTRIAL APPLICABILITY

The present invention can be suitably applied to an automobile in which a door opening part of the vehicle body includes a sealing member for closing off the gap between the door and the door opening part when the door opening part has been closed by the door.

REFERENCE SIGNS LIST

10 Vehicle
11 Vehicle body
18 Door opening part
20 Front side door (door)
23 Inner panel
24 Outer panel
25 Seal structure (vehicular seal structure)
26 Sealing member
27 Clip
31 Seal attachment wall
31a Upper end of seal attachment wall
32 Upper wall
33 Corner part
35 Flange part
36 Orthogonal part
38 Inner gap between front side door and door opening part (gap between door and door opening part)
45 Seal base part
46 First lip seal
47 Second lip seal
48 Third lip seal
51 Hollow part
55 Connecting part (lower end of seal base part)
61 First base part
62 First lip (other section)
62a Distal end of first lip (distal end of first lip seal)
71 Second base part
72 Second lip (other section)
72a Distal end of second lip (distal end of second lip seal)
73 Protruding part
W1, W2 Thickness dimensions

The invention claimed is:

1. A vehicular seal structure in which a sealing member is attached to a door opening part formed in a vehicle body, and a gap between a door and the door opening part is closed off by the sealing member when the door opening part has been closed by the door, the door comprising a flange part formed by an inner panel and an outer panel of the door being joined and an orthogonal part which is a part of the inner panel that is substantially orthogonal to the flange part and extends inward with respect to the vehicle, the sealing member being secured solely by clips to a seal attachment wall that is a flat surface of the door opening part, the sealing member comprising:

a seal base part attached to the seal attachment wall by the clips, the seal base part comprising a connecting part;
a first lip seal extending from the connecting part and having a free distal end; and
a second lip seal extending from the connecting part and having a free distal end,
wherein in a state that the door opening part is closed by the door, the distal end of the first lip seal abuts the flange part at a position apart from an edge of the flange part, part of the first lip seal other than the distal end does not abut the edge of the flange part, and the distal end of the second lip seal abuts the orthogonal part, and
wherein the sealing member is attached to the seal attachment wall at an upper side of the door opening part, above the orthogonal part of the door when the door is closed.

2. The vehicular seal structure of claim 1,
wherein the seal base part of the sealing member extends vertically along the seal attachment wall, the connecting part forming a lower end of the seal base part and the second lip seal extending downward from the connecting part, and
wherein the orthogonal part is substantially orthogonal to the seal attachment wall.

3. The vehicular seal structure of claim 2,
wherein the vehicle body further comprises an upper wall extending laterally outward from the upper end of the seal attachment wall so as to be substantially orthogonal to the seal attachment wall, a concave corner part being formed at an intersecting part of the upper wall and the seal attachment wall,
wherein the sealing member further comprises a third lip seal extending from the seal base part toward the upper wall, and
wherein the third lip seal abuts the corner part.

4. The vehicular seal structure of claim 1, wherein a hollow part is formed in the seal base part.

5. The vehicular seal structure of claim 1, wherein a first base part of the first lip seal is connected to the connecting part, and the first base part is narrower than a part of the first lip seal between the first base part and the free distal end of the first lip seal.

6. The vehicular seal structure of claim 1, wherein a second base part of the second lip seal is connected to the connecting part, and the second base part is narrower than a part of the second lip seal between the second base part and the free distal end of the second lip seal.

7. The vehicular seal structure of claim 1, wherein the distal end of the second lip seal has a protruding part that protrudes upward.

* * * * *